United States Patent
Li et al.

(10) Patent No.: US 9,817,133 B2
(45) Date of Patent: Nov. 14, 2017

(54) HEAT CONTROLLING APPARATUS FOR A DETECTOR OF A CT MACHINE AND A DETECTOR

(71) Applicant: GENERAL ELECTRIC COMPANY, Schenectady, NY (US)

(72) Inventors: Xinfeng Li, Beijing (CN); Hua Zhang, Beijing (CN); Pengcheng Liu, Beijing (CN); Joseph James Lacey, Waukesha, WI (US)

(73) Assignee: General Electric Company, Schenectady, NY (US)

( * ) Notice: Subject to any disclaimer, the term of this patent is extended or adjusted under 35 U.S.C. 154(b) by 181 days.

(21) Appl. No.: 15/043,245

(22) Filed: Feb. 12, 2016

(65) Prior Publication Data
US 2016/0242314 A1    Aug. 18, 2016

(30) Foreign Application Priority Data
Feb. 15, 2015    (CN) .......................... 2015 1 0081872

(51) Int. Cl.
*A61B 6/03*        (2006.01)
*G01T 1/20*        (2006.01)

(52) U.S. Cl.
CPC .................. *G01T 1/2018* (2013.01)

(58) Field of Classification Search
CPC ... H01L 2924/0002; G01T 1/00; G01T 1/244; G01T 1/2928; G01T 1/2018; A61B 6/4488; A61B 6/4233
USPC ................ 250/370.15, 370.01; 378/189, 190
See application file for complete search history.

(56) References Cited

U.S. PATENT DOCUMENTS

| | | | |
|---|---|---|---|
| 7,161,157 B2 | 1/2007 | Lacey | |
| 7,304,309 B2 | 12/2007 | Suhami | |
| 7,338,208 B2 | 3/2008 | Lacey | |
| 8,208,600 B2 | 6/2012 | Tsumuraya et al. | |
| 8,532,250 B2 | 9/2013 | Hashimoto et al. | |
| 2011/0214489 A1 | 9/2011 | Grant et al. | |
| 2011/0248177 A1* | 10/2011 | Crocker | H01L 23/3677 250/370.15 |
| 2012/0033784 A1 | 2/2012 | Matsuda et al. | |
| 2013/0279648 A1 | 10/2013 | Joshi et al. | |
| 2014/0013831 A1 | 1/2014 | Grant et al. | |

\* cited by examiner

*Primary Examiner* — Don Wong

(57) ABSTRACT

A heat controlling apparatus for a detector of a CT machine and a detector. The heat controlling apparatus comprises: a heat conducting frame, which is disposed at a side where a chip on a circuit board in the detector is located; a heater, which thermally contacts with the heat conducting frame and is used for heating the heat conducting frame; a heat dissipating member, which is connected with the heat conducting frame and used for dissipating heat produced by the detector; and a heat isolating member, which is wrapped at a periphery of a collimator of the detector, the heat conducting frame and the heater.

10 Claims, 2 Drawing Sheets

HEAT CONTROLLING APPARATUS FOR A DETECTOR OF A CT MACHINE AND A DETECTOR

BACKGROUND

Embodiments of the present invention relate to a heat controlling apparatus and a detector, and particularly to a heat controlling apparatus for a detector of a CT machine and a detector for a CT machine.

A detector in a computed tomography (CT) machine may be used for receiving X-rays emitted by a CT tube and penetrating a detected object. The detector in the CT machine may consist of multiple detector modules, each of which may contain a collimator, a photodiode, a scintillator, a circuit board, etc.

During operation, an analog-to-digital converter (ADC), an FPGA chip, a power chip, etc. on the circuit board will produce relatively much heat. A temperature change resulting from such heat will cause the performances of these chips and devices such as the collimator, the photodiode, the scintillator, etc. within the detector modules to change, which will result in artifacts appearing on a CT image eventually produced. Accordingly, there is a need to use a heat controlling apparatus to correctly regulate and control the temperature of the detector during operation.

The existing heat controlling apparatus mainly controls the temperature of the detector by a loop consisting of a temperature sensor, a control module and a fan. The control module controls the magnitude of the rotation speed of the fan according to the temperature outputted by the temperature sensor, so as to play the role of controlling the temperature. Such apparatus has the following disadvantages: more modules, more complicated control loop, and higher cost.

SUMMARY OF THE INVENTION

The objective of the present invention is to provide a heat controlling apparatus with fewer modules, a simple control loop and a lower cost, and to provide a corresponding detector of a CT machine.

One embodiment of the present invention provides a heat controlling apparatus for a detector of a CT machine, comprising: a heat conducting frame, which is disposed at a side where a chip on a circuit board in the detector is located; a heater, which thermally contacts with the heat conducting frame and is used for heating the heat conducting frame; a heat dissipating member, which is connected with the heat conducting frame and used for dissipating heat produced by the detector; and a heat isolating member, which is wrapped at a periphery of a collimator of the detector, the heat conducting frame and the heater.

Another embodiment of the present invention provides a detector of a CT machine, comprising a plurality of detector modules and further comprising: the heat controlling apparatus according to the present invention.

BRIEF DESCRIPTION OF THE DRAWINGS

The present invention can be better understood in light of the following description of embodiments of the present invention with reference to the accompanying drawings, in which.

DETAILED DESCRIPTION

Figure 1:
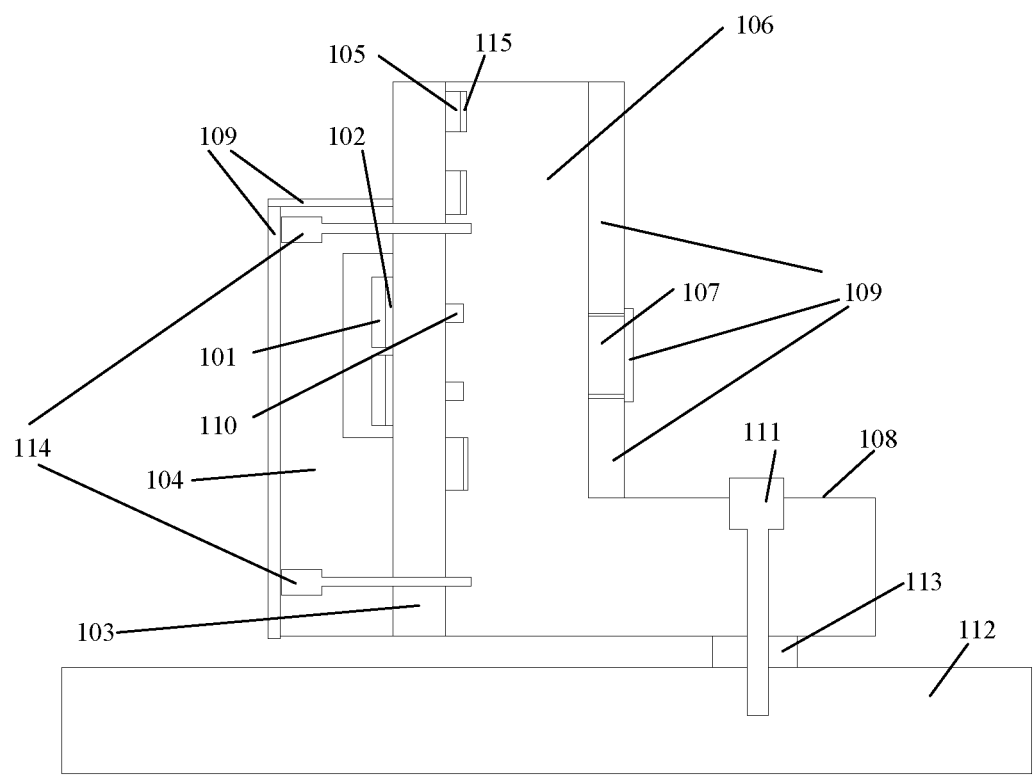
FIG. 1 is a structure schematic diagram illustrating one embodiment of a heat controlling apparatus for a detector of a CT machine according to the present invention.

Hereafter, a detailed description will be given for embodiments of the present invention. It should be pointed out that in the detailed description of the embodiments, for simplicity and conciseness, it is impossible for the Description to describe all the features of the practical embodiments in details. It should be understood that in the process of a practical implementation of any embodiment, just as in the process of an engineering project or a designing project, in order to achieve a specific goal of the developer and in order to satisfy some system-related or business-related constraints, a variety of decisions will usually be made, which will also be varied from one embodiment to another. In addition, it can also be understood that although the effort made in such developing process may be complex and time-consuming, some variations such as design, manufacture and production on the basis of the technical contents disclosed in the disclosure are just customary technical apparatus in the art for those of ordinary skilled in the art relating to the contents disclosed in the present invention, which should not be regarded as insufficient disclosure of the present invention.

Unless defined otherwise, all the technical or scientific terms used in the Claims and the Description should have the same meanings as commonly understood by one of ordinary skilled in the art to which the present invention belongs. The terms "first", "second" and the like in the Description and the Claims of the present application for invention do not mean any sequential order, number or importance, but are only used for distinguishing different components. The terms "a", "an" and the like do not denote a limitation of quantity, but denote the existence of at least one. The terms "comprises", "comprising", "includes", "including" and the like mean that the element or object in front of the "comprises", "comprising", "includes" and "including" encompasses the elements or objects and their equivalents illustrated following the "comprises", "comprising", "includes" and "including", but do not exclude other elements or objects. The term "coupled", "connected" or the like is not limited to being connected physically or mechanically, nor limited to being connected directly or indirectly.

In order to make the purpose, the technical solutions and the advantages of the invention more apparent, the technical solutions of the present invention will be set forth clearly and fully hereinafter in combination with specific embodiments of the invention and the corresponding accompanying drawings. Obviously, the described embodiments are merely part—not all—of the embodiments in the present invention. In view of the embodiments in the present invention, other embodiments made by one of ordinary skilled in the art without inventive work all fall within the scope of protection of the present invention.

The heat controlling apparatus in an embodiment of the present invention may only employ a heater to ensure the temperature of a detector during operation to be stable, without needing a fan.

Usually, the detector in a CT machine consists of multiple detector modules. In one embodiment of the present invention, a set of the heat controlling apparatus in the embodiment of the present invention may be set for each of the multiple detector modules.

Referring to FIG. 1, FIG. 1 is a structure schematic diagram illustrating one embodiment of a heat controlling apparatus for a detector of a CT machine according to the present invention. In FIG. 1, the heat controlling apparatus on one detector module is used as an example for illustration, and the heat controlling apparatuses on other detector modules are similar thereto. One detector module as shown in FIG. 1 may contain a photodiode 101, a scintillator 102, a circuit board 103, and a collimator 104. The photodiode 101 and the scintillator 102 may be located at one side of the circuit board 103 (the left side as shown in FIG. 1), and a chip 105 such as FPGA, a power chip and an analog-to-digital converter (ADC) on the circuit board may be located at the other side of the circuit board 103 (the right side as shown in FIG. 1).

The heat controlling apparatus as shown in FIG. 1 may include a heat conducting frame 106, a heater 107, a heat dissipating member 108, and a heat isolating member 109.

The heat conducting frame 106 may be disposed at one side where the chip 105 on the circuit board 103 in the detector (the right side as shown in FIG. 1) is located. The heat conducting frame 106 may be made of material with high thermal conduction in order to ensure that the heat conducting frame 106 can always be in an isothermal state. The heat conducting frame 106 may also support the detector module.

Figure 2:
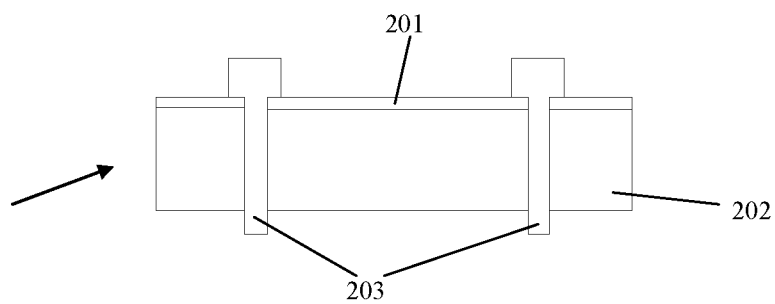
FIG. 2 is a structure schematic diagram illustrating one embodiment of a heater in the heat controlling apparatus according to the present invention.

The heater 107 may thermally contact with the heat conducting frame 106, used for heating the heat conducting frame 106. In one embodiment of the present invention, the heater 107 may employ a heating resistor as its heating body. In one embodiment of the present invention, the heating resistor may be directly sticked onto an outer wall of the heat conducting frame 106. In another embodiment of the present invention, referring to FIG. 2, the heating resistor 201 may be at first sticked onto a supporting body 202 and then, the supporting body 202 and the heating resistor 201 may be fixed onto the heat conducting frame 106 by a screw 203, such that the heating resistor 201 may be conveniently detached and replaced.

The heat dissipating member 108 may be connected with the heat conducting frame 106, for dissipating heat produced by the detector. In one embodiment of the present invention, the heat dissipating member 108 may be integrated with the heat conducting frame. The surface area of the heat dissipating member 108 may be set after calculation to ensure a suitable heat dissipation quantity.

The heat isolating member 109 may be wrapped at the periphery of the collimator 104 of the detector, the periphery of the heat conducting frame 106, and the periphery of the heater 107. In this way, the heat produced within the detector module can only be dissipated out by the heat dissipating member 108 that is not wrapped by the heat isolating member 109.

In one embodiment of the present invention, heat conducting material 115 may also be laid between the main heated region (e.g., devices with large quantity of heat such as FPGA, a power chip, an analog-to-digital converter, etc.) on the heat conducting frame 106 and the circuit board 103 and the heat conducting frame. In this way, it may facilitate the heat of the heated region to be dissipated to the heat conducting frame 106 better.

In one embodiment of the present invention, a temperature sensor 110 and a heating controller (not shown in the figure) may also be set in order to control the temperature of the detector module better. Referring to FIG. 1, in one embodiment of the present invention, the temperature sensor 110 may be located on the circuit board 103. Specifically, the temperature sensor 110 may be located on front and back surfaces of the photodiode 101 on the circuit board 103 and thermally contact with the photodiode 101 via a heat conductor passing through the circuit board 103, such that the temperature of the photodiode is correctly detected. The heating controller may be connected with the temperature sensor 110, for controlling the heating temperature of the heater 107 to be higher than the temperature within a scanning gantry where the detector is located and lower than an operating temperature upper limit of the detector according to the output of the temperature sensor 110. For example, the operating temperature upper limit of the detector is 45° C. and the temperature within the scanning gantry where the detector is located is 37° C., then the heater 107 may be controlled by the heating controller such that the temperature within the detector is maintained between 37° C. and 45° C. (e.g., about 42° C.). In one embodiment of the present invention, the heating controller may be located on the circuit board 103 or located on a data acquisition system (DAS) board of the CT machine.

As shown in FIG. 1, in one embodiment of the present invention, the heat conducting frame 106 may be fixed on a detector installing member 112 in the scanning gantry of the CT machine by a screw 111. In one embodiment of the present invention, heat isolating material may be utilized between the heat conducting frame 106 and the detector installing member 112, and a heat isolating gasket 113 may be utilized around the screw 111.

As shown in FIG. 1, in one embodiment of the present invention, in order to ensure that the temperature of the collimator 104 is stable and controllable during operation, the collimator 104 may be fixed on the heat conducting frame 106 by a screw 114.

On one hand, the aforementioned structure ensures that the photodiode 101, the scintillator 102, the heat conducing frame 106 and the temperature sensor 110 in the detector are always in a close thermal contact state. On the other hand, the aforementioned structure ensures that the detector and the part of the whole heat controlling apparatus except the heat dissipating member 108 are both in a heat insulation state. In this way, correct input information may be provided for the heating controller such that the heating controller can correctly control the temperature.

Figure 3:
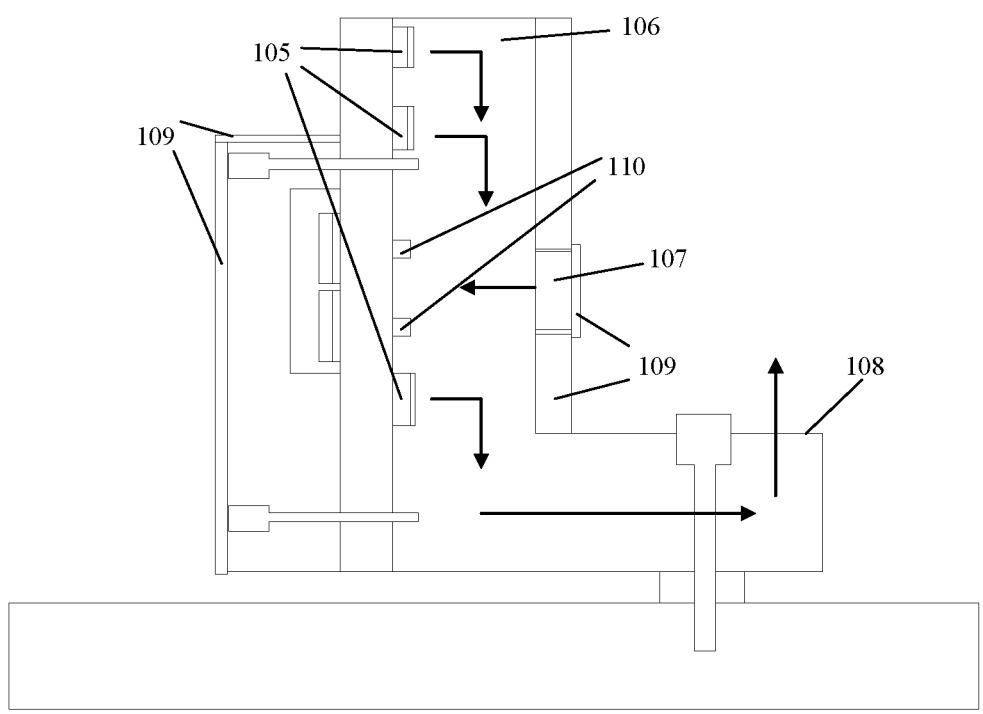
FIG. 3 is a schematic diagram illustrating a heat flowing path of the heat controlling apparatus according to the present invention during operation.

Referring to FIG. 3, FIG. 3 is a schematic diagram illustrating a heat flowing path of the heat controlling apparatus during operation according to the present invention. In the heat controlling apparatus as described in the embodiment of the present invention, the heat will flow in the light of the direction as shown by an arrow in FIG. 3: the heat from the heater 107 is applied to the devices within the detector module by the heat conducting frame 106, the heat produced by these devices is dissipated out by the heat dissipating member 108 connected with the heat conducting frame.

So far, the heat controlling apparatus for the detector of the CT machine and the corresponding detector according to the embodiment of the present invention have been described. Such heat controlling apparatus does not need a fan so as to reduce the complexity of the heat controlling apparatus reducing the cost. The detector employing such a heat controlling apparatus can retain that the temperature is stably slightly higher than the temperature within the scanning gantry and always lower than the temperature upper limit allowable to the detector during operation.

The above descriptions are merely embodiments of the invention and are not intended to restrict the scope of the invention. All kinds of variations and modifications could be made to the present invention to those skilled in the art. Any modifications, alternatives and improvements made within the spirit and principles of the present invention shall fall within the scope of the appended claims.

What is claimed is:

1. A heat controlling apparatus for a detector of a CT machine, comprising:
   a heat conducting frame, which is disposed at a side where a chip on a circuit board in said detector is located;
   a heater, which thermally contacts with said heat conducting frame and is used for heating said heat conducting frame;
   a heat dissipating member, which is connected with said heat conducting frame and used for dissipating heat produced by said detector; and
   a heat isolating member, which is wrapped at a periphery of a collimator of said detector, said heat conducting frame and said heater.

2. The heat controlling apparatus according to claim 1, further comprising:
   heat conducting material, which has one side contacting with said heat conducting frame and the other side contacting with a heated region on said circuit board.

3. The heat controlling apparatus according to claim 1, further comprising:
   a temperature sensor, which is located on said circuit board; and
   a heating controller, which is connected with said temperature sensor and used for controlling a heating temperature of said heater to be higher than a temperature within a scanning gantry where said detector is located and lower than an operating temperature upper limit of said detector according to an output of said temperature sensor.

4. The heat controlling apparatus according to claim 3, wherein said heating controller is located on said circuit board or located on a DAS board of said CT machine.

5. The heat controlling apparatus according to claim 1, wherein said heater further comprises:
   a heating body for generating heat; and
   a supporting body, which has one side thermally contacting with said heating body and the other side fixed on said heat conducting frame by a screw.

6. The heat controlling apparatus according to claim 1, wherein said heater is sticked to an outer wall of said heat conducting frame.

7. The heat controlling apparatus according to claim 1, wherein said heat conducting frame is fixed on a detector installing member in a scanning gantry of said CT machine by a screw.

8. The heat controlling apparatus according to claim 1, wherein the collimator of said detector is fixed on said heat conducting frame by a screw.

9. A detector of a CT machine comprising a plurality of detector modules, further comprising:
   controlling apparatus according to claim 1.

10. The detector according to claim 9, wherein a set of said heat controlling apparatus is disposed on each of said detector modules.

* * * * *